United States Patent
Yananton

(12) 
(10) Patent No.: US 7,647,890 B1
(45) Date of Patent: *Jan. 19, 2010

(54) DISPOSABLE NON-WOVEN PAD AND METHOD FOR ENTRAPPING PET HAIR AND DANDER

(76) Inventor: Pat Yananton, 1598 Oak Gen Rd., Toms River, NJ (US) 08753

( * ) Notice: Subject to any disclaimer, the term of this patent is extended or adjusted under 35 U.S.C. 154(b) by 0 days.

This patent is subject to a terminal disclaimer.

(21) Appl. No.: 10/876,310

(22) Filed: Jun. 24, 2004

Related U.S. Application Data

(63) Continuation-in-part of application No. 10/745,147, filed on Dec. 23, 2003, which is a continuation-in-part of application No. 10/269,713, filed on Oct. 11, 2002, and a continuation-in-part of application No. 10/033,862, filed on Dec. 20, 2001.

(51) Int. Cl.
*A01K 29/00* (2006.01)

(52) U.S. Cl. ..................................................... 119/171

(58) Field of Classification Search ................. 119/159, 119/165, 168, 171–173, 161; 15/208–233; 428/88, 92, 95, 317.9, 320.2; 442/43–47, 442/59, 60, 63, 77, 84, 96; 604/359, 360, 604/365, 367

See application file for complete search history.

(56) References Cited

U.S. PATENT DOCUMENTS

| | | | |
|---|---|---|---|
| 3,658,578 A | | 4/1972 | Bennett |
| 3,665,921 A | * | 5/1972 | Stumpf ........................ 604/366 |
| 3,717,897 A | | 2/1973 | Amos et al. |
| 4,129,132 A | * | 12/1978 | Butterworth et al. ......... 604/366 |
| 4,372,867 A | * | 2/1983 | Taragos .................... 15/104.93 |
| 4,484,250 A | * | 11/1984 | Rzepecki et al. ............. 361/220 |
| 4,774,907 A | | 10/1988 | Yananton |
| 4,800,677 A | | 1/1989 | Mack |
| 4,861,632 A | | 8/1989 | Caggiano |
| 4,913,954 A | | 4/1990 | Mack |
| 4,963,431 A | | 10/1990 | Goldstein et al. |
| 5,173,346 A | | 12/1992 | Middleton |
| 5,338,340 A | | 8/1994 | Kasmark, Jr. et al. |
| 5,431,643 A | | 7/1995 | Ouellette et al. |

(Continued)

FOREIGN PATENT DOCUMENTS

GB      2193431 A   *   2/1988

OTHER PUBLICATIONS

Aimone, James, Challenges and Opportunities for Designing and Manufacturing Molded and Needled Automotive Products, pp. 869-874.

(Continued)

*Primary Examiner*—Thomas Price
(74) *Attorney, Agent, or Firm*—John D. Gugliotta, PE, Esq

(57) ABSTRACT

A pad comprising at least one high loft non-woven layer for entrapping pet particles such as pet hair and pet dander from a pet or other items such as furniture or clothing, and a method for entrapping pet particles. The pad preferably includes a cling-enhancing substance. The pad can also include deodorizing agents, an impermeable layer, or a middle absorbent layer for absorbing moisture from or applying treatments to a pet.

23 Claims, 2 Drawing Sheets

U.S. PATENT DOCUMENTS

| | | | | |
|---|---|---|---|---|
| 5,695,376 | A * | 12/1997 | Datta et al. | 442/334 |
| 5,768,709 | A * | 6/1998 | Newkirk et al. | 119/611 |
| 5,811,186 | A * | 9/1998 | Martin et al. | 428/373 |
| 5,819,688 | A | 10/1998 | Walker | |
| 5,834,104 | A | 11/1998 | Cordani | |
| 5,846,603 | A | 12/1998 | Miller | |
| 5,961,763 | A | 10/1999 | Makoui et al. | |
| 6,129,978 | A | 10/2000 | Caldwell | |
| 6,219,876 | B1 | 4/2001 | Blum | |
| 6,458,442 | B1 | 10/2002 | McKay | |
| 6,569,274 | B1 | 5/2003 | Makoui et al. | |
| 6,569,494 | B1 | 5/2003 | Chambers et al. | |
| 6,746,974 | B1 | 6/2004 | Reiterer et al. | |
| 2002/0160143 | A1 * | 10/2002 | Shepard et al. | 428/88 |
| 2003/0217425 | A1 * | 11/2003 | Datta et al. | 15/227 |

OTHER PUBLICATIONS

Allen, Jr., H. Charles, The Cotton Fiber Process and Fiber Characteristics, pp. 7-34.
Akers, Paul, Differentiating Superabsorbent Fibers, pp. 119-126.
Angelini, Peter J., Fiber to Web Process—Wet Lay, pp. 567-579.
Gilmore, Thomas F., Protecting Nonwoven Creativity: The Importance of Patents, pp. 890-897, College of Textiles, North Carolina State University.
Arulf, Sandra S., The Polyester Fiber Process and Fiber Characteristics, pp. 59-69.
Bakra, S.K. et al., Neither Woven Nor Knit: A New System For Classifying Textiles, pp. 515-523, North Carolina State University.
Behery, Hassan M. et al., Effect of Production Variables on Properties of Ultrasonically Bonded Nonwovens, pp. 657-674.
Blam, A.F. et al., A New Class of Fire Retarding Latexes for Nonwovens, pp. 305-320.
Bodaghi, Ph.D., Hassan, Melt Blown Microfiber Characterization, pp. 441-477.
Bouchillon, Randall E., Bicomponent Fibers Worldwide, pp. 149-159.
Brandon, R.E. et al., Utilization of Glass Fibers in Nonwoven Fabrics, pp. 179-190.
Britton Ph.D., Peter N., Spunlace Processes Worldwide, pp. 613-627.
Calliari, Mark J., Basics of Nonwovens: Converting Processes, pp. 855-867, Green Bay, Wisconsin.
Chou, Lee-Pei H. et al., A Novel Method to Determine the Binder Level in Nonwoven Webs, pp. 413-433.
Cluthe, Dr. Charles E. et al., Rheology Modification of Coatings for Converting Nonwoven Fabrics, pp. 335-366.
Cooke, Theodore F., Superabsorbent Fibers, pp. 99-117.
Davies, Barrie L., New Developments in Bicomponent Fibers, pp. 127-148.
Ettekoven, H. Van et al., Double-Sided Printing, Finishing and Coating with the Screen-to-Screen Technology, pp. 735-744.
Foster, John H., Needlepunching Past, Present, and Future, pp. 681-702.
Gill, R.A. et al., Design of Acrylic Resin Binders for Medical Nonwoven Applications, pp. 367-375.
Goldstein Ph.D., Joel E. et al., Nonwoven Applications for Polyvinyl Alchohol, pp. 271-283.
Goodchild, William C., Compressive Treatment Technology, pp. 757-762.
Hansen, William L., Converting and Product Development Considerations for Pressure Sensitive Adhesive Coated Products, pp. 879-888.
Hardy, Craig, The Rayon Fibre Process and Fibre Characteristics, pp. 35-57.
Hotstetter, B.J. et al., A Monte Carlo Simulation to Predict Tensile Properties of Nonwoven Fabrics, pp. 397-412.
Humphrey, Keith et al., The Application of Image Analysis Within the Nonwovens Industry, pp. 801-824.
Jubilee, Benjamin, Acrylics and Acrylic Copolymer Materials, pp. 197-203.
Kaija, Arnold, Electrostatic and Mechanical Fiber Coating, p. 745-750.
Kelly, David G., The Balance of Strength and Softness in Saturation-Bonded Polyester Nonwovens Used for Interlinings, pp. 839-851.
Kinn, Larry L. et al., Fiber Length-Fiber Surface Area Relationships in Wet-Laid Polyester Nonwovens, pp. 763-775.
Ko, Frank K. et al., Computer Aided Design of Nonwoven Fabrics, pp. 377-396.
Ko, Frank K. et al., Structure and Properties of Carded Glass Composites, pp. 825-838.
Koltisko Ph.D, Bernard M., Vinyl Copolymer Materials, pp. 221-248.
Lochmaier, Wayne, Fiber Classifications and Definitions, pp. 1-5.
Mathews, Grace, Mechanical Finishing, pp. 751-755.
MCintosh, Bruce, Developments in Peek Fibers Opportunities in High Tech Applications, pp. 89-98.
McMeekin, Linda J. et al., Visualizing Structure in Nonwovens, pp. 785-800.
Mercer, Scott A., Innovative Adhesive Application Systems: From Simplicity to Complexity, pp. 655-656, Hendersonville, TN.
Mlynar, Michele F. et al., Processing Aids for Resin Bonded Nonwoven Webs, pp. 249-257.
Johnson, Richard H., Chemical Non-Woven Web Bonding, pp. 629-632.
Johnston, Milo, Resin to Web Process—Meltblowns, pp. 585-604.
Morgan, David J., Bicomponent Fibers, pp. 71-80.
Nelson, David L., Dry Lay Web Forming, pp. 549-566.
Narayan, Ramani, Rationale and Design of Environmentally Degradable Nonwovens, pp. 435-439, Michigan State University.
Pangrazi, Ronald, Low Formaldehyde Nonwoven Binders. pp. 263-270.
Parker, Roy B., Structural Properties of Needlefelts, pp. 605-612.
Powers, Mark, Fiber Spin Finish Technology, pp. 191-196.
Reed, John F., Direct Process Nonwovens: Forming Webs During Fiber Spinning, pp. 81-88.
Riedel, John E., Product Enhancers, pp. 259-262.
Riedel, John E., Nonwoven Web Forming—Fiber Overview, pp. 539-548.
Riedel, John E., Basics of Nonwovens Converting Processes, pp. 853-854.
Rogers, Randall J., Methods, Materials and Products of Thermal Bonding, pp. 633-654.
Ryle, Thomas R., Extrusion Coating and Lamination of Nonwovens, pp. 717-727.
Sabia, A.J. et al., The Effect of Various Silicone Finishes on the Tactile and Physical Properties of Nonwoven Substrates, pp. 321-333.
Scardino, Frank, Evaluation of Nonwoven Fabrics with the KES Testing Equipment, pp. 777-784, Philadelphia College of Textiles and Science.
Shortmann, Walter E., Chemical Treatments for Comfortable Barrier Fabrics, pp. 703-716.
Smorada, Dr. Ronald L., Resin to Web Process-Spunbond, pp. 581-584.
Stark, David E. et al., Foaming Equipment for Nonwovens, pp. 675-680.
Straeffer, Gregory et al, Mechanical and Structural Properties of Melt-Blown Fibers, pp. 479-513.
Stull, Jeffrey O., Converting Processes for Protective Apparel/Devices, pp. 875-877, Austin, TX.
Thompson, Del R. et al., New Fluorochemicals for Protective Clothing, pp. 285-304.
Wilkes, Dr. A.G., A New Viscose Rayon Fibre for Nonwovens, pp. 161-177.
Vandermaas, J.K. et al., Dyeing of Nonwovens, pp. 729-734.
Williams, Martin M. et al., Styrene Butadiene Latex Polymers for Nonwovens Applications, pp. 205-220.
Wadsworth, Larry C. et al., Melt Blown Processing and Characterization of Fluoropolymer Resins, pp. 525-538, The University of Tennessee.

* cited by examiner

DISPOSABLE NON-WOVEN PAD AND METHOD FOR ENTRAPPING PET HAIR AND DANDER

CROSS-REFERENCE TO PRIOR PATENT APPLICATIONS

This application is a continuation-in-part of pending U.S. patent application Ser. No. 10/745,147 filed Dec. 23, 2003, which is a continuation-in-part of the following pending U.S. Patent Applications:

Ser. No. 10/269,713 filed Oct. 11, 2002; and
Ser. No. 10/033,862, filed Dec. 20, 2001, the subject matter of which are incorporated herein by reference thereto as though recited in full.

FIELD OF THE INVENTION

The present invention is directed generally to a lightweight, disposable pad comprised of non-woven fibers that entrap particles, and particularly to a disposable, porous, highloft pad that entraps particles from pets or clothing, and furniture such as fur and dander when brushed across the pet or other surfaces.

BACKGROUND OF INVENTION

Pet owners face the continuous challenge of keeping their pets well brushed to reduce shedding as well as removing shed pet hair, dirt and dander from items such as furniture, clothing, and bedding. Devices commonly used for these tasks are various brushes, combs, and rollers. Unfortunately, pets are not always fond of these devices.

Further, these devices are expensive, difficult to pack and carry, and must be cleaned and routinely disinfected. Many pet care and household items require a pad for trapping stray particles, fur, and dander. The Prior Patent Applications cited above which where incorporated therein by reference as if fully rewritten describe other uses of this highloft nonwoven material.

SUMMARY OF THE INVENTION

The instant invention is directed to a multiple-use, particle-catching pad made of a highloft non-woven fabric having randomly oriented fibers forming an open porous matrix or web structure which can have a surface of open ends, closed-loop ends, or a combination of open and closed-loop ends. The structure of the pad can include a plastic or otherwise back layer impermeable, or nearly impermeable layer and a high loft, filamentous, open porous non-woven top layer or can include merely one or more non-woven layers. The non-woven layer can also be treated with dry particulate active ingredient or odor-reducing products such as baking soda and other deodorizers, as well as anti flea, tick, or other medications. Other substances such as oily, sticky, or static substances can be added to the non-woven layer to enhance particle entrapment by enhancing the cling of the top non-woven. The non-woven layer is preferably treated with a tacky substance to enhance clinging and adhesive properties.

The high loft non-woven pads of the present invention can be the standard manufactured nonwovens or the openness can be enhanced by cutting, converting, or otherwise performing some mechanical manipulation to the nonwoven fibers and abrading the cut or converted surface to create separations in the surface fibers such that the open-ended non-woven surface that can easily catch and trap particles. The pads are manufactured easily and inexpensively, are durable, and can be treated with or contain additional odor counteractive agents, baking soda, silica particles, medications, grooming lotions, super absorbent polymers, or combinations of all of the above, and anti-bacterials as well as oils, tackifying agents of all natures to enhance the particle-entrapping natures of the pad. Pads can be manufactured as strict particle entrapping, two-layered pads, or absorbent liquid absorbing or dispersing, particle trapping three-layer pads. These pads can replace old-fashioned brushes and lint rollers that are used for people's clothing. The pads can also deliver skin or fur medication, flea, tick medication, as well as other ingredients that help the pet.

DESCRIPTION OF THE FIGURES

FIG. 1 C is a side view of a two-layer, particle-entrapping, combination highloft non-woven pad designed for small and large particles.

DETAILED DESCRIPTION OF THE INVENTION

Figure 1A:
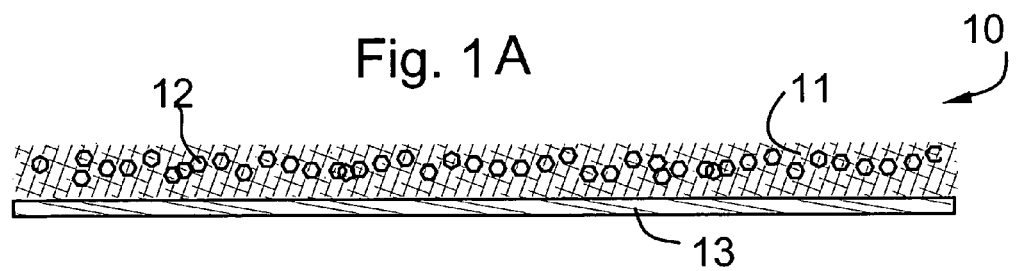
FIG. 1 A is a side view of a two-layer particle-entrapping highloft nonwoven pad designed for large particles.
FIG. 1B is a side view of a two-layer particle-entrapping highloft non-woven pad designed for small particles.
Figure 1B:
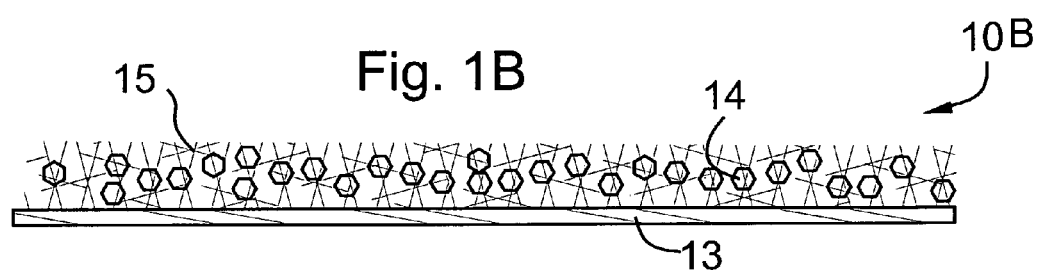

The instant invention is a highloft, nonwoven porous particle-entrapping pad or wipe for use in controlling the loss and spread of pet hair and dander, absorbing moisture, deodorizing, and applying pet hair (fur) and skin care products. The pad is similar in design to that described in U.S. Pat. No. 4,774,907 to Yananton, which is incorporated herein by reference as though reproduced in its entirety. The pad includes at least one highloft non-woven layer. Optionally, the pad can include additional non-woven layers, a bottom impervious layer, or a middle absorbent layer. The absorbent layer can be a sponge material, wood pulp, or contain a superabsorbent polymer in combination FIG. 1A shows a single layer non-woven pad 10 wherein the porous highloft non-woven web layer 11 entraps particles 12 such as pet hair and dander while FIG. 1B shows a multi-layer, less dense non-woven pad 10 wherein the non-woven layers 11 and 13 entrap coarse or large particles 14. In the embodiments of either FIG. 1A or 1B, a tacky substance is added to the highloft non-woven to increase the holding capacity. This tacky substance preferably includes tackifier resins such as rosin resins, hydrogenated rosin resins, hydrocarbon resins, hydrogenated hydrocarbon resins, liquid resins, and terpene resins. Other additives such as oil or surfactant can also increase the holding capacity of the non-woven layers, or static charge for additional cling can be maintained by the composition of the fibers or added ingredients. Additionally, solid dry particulate active ingredient deodorizing agents such as baking soda, antibacterials, flea and tick medications, etc can be added either to the non-woven layer(s) 11 or between layers 11 and 13.

Figure 1C:
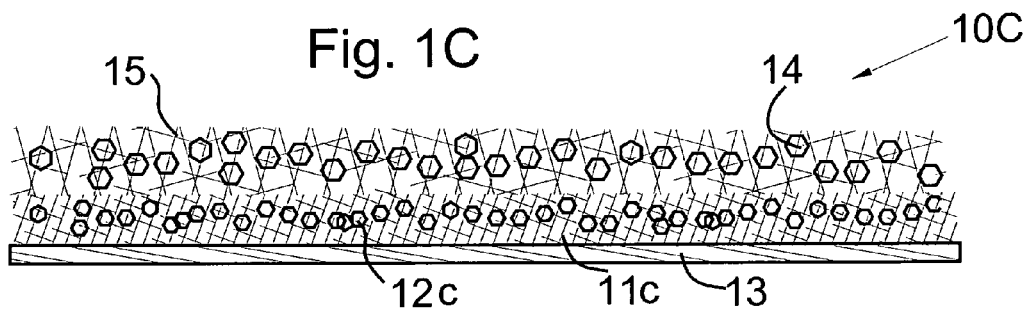

FIG. 1C shows the combination of a less dense open loop porous highloft layer 15 in combination with a more dense open porous highloft layer 1C. The structure includes an impervious layer 13. Large particles 14 are trapped in the less dense porous highloft layer 15 and small particles 12C are trapped in the more dense highloft layer 11C.

The open porous highloft non-woven material of the present invention has a scrubbing property due to the open irregular surface and the open inner matrix that entraps pet hair and dander. The non-woven pad is simply swept across a pet's coat to effectively remove loose hair (fur) dander or soil from the pet. The hair (fur) is trapped in and on the pad and is easily disposable. Another use of the pad includes removing pet hair, soil and dander from other items such as clothes and furniture. Again, the pad is swept across the contaminated surface thereby entrapping lint, hair and dander.

Figure 2A:
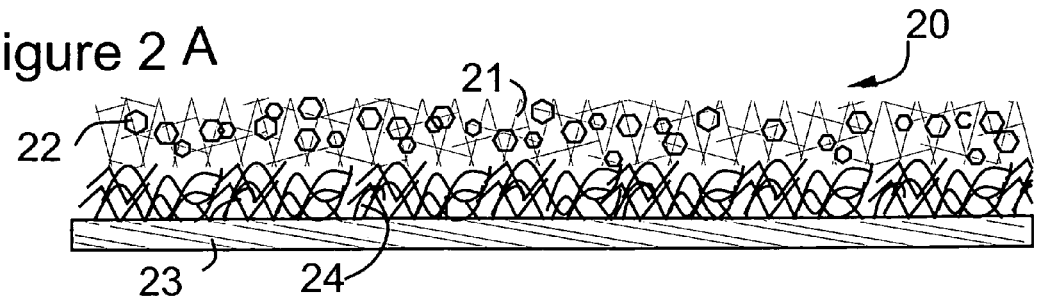
FIG. 2 is a side view of a three-layer particle-entrapping highloft non-woven pad designed for small and course particles and for liquid absorbency.
Figure 2B:
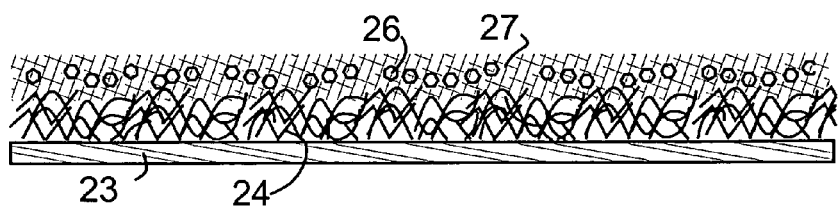
Figure 2C:
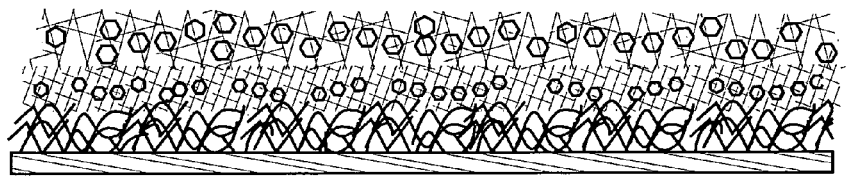

The premanufactured highloft non-woven material of the present invention can have the denier or density varied or combined to trap and hold large particles as shown in FIGS. 2A, B and C, small particles as shown in FIG. 2B, or both as shown in FIG. 2C. In order for coarse, large particles to fall within the non-woven, the less dense more open non-woven layer should preferably be the top layer as shown in FIG. 2C. This is not as critical to the entrapment of small particles, which will fall within the more dense finer opening porous highloft non-wovens.

FIG. 2A shows one embodiment of a three layer particle-entrapping pad 20 for large, coarse particles but also capable of holding small particles. The high loft open porous non-woven top layer 21 is secured to a plastic liquid impervious bottom layer 23. Top layer 21 predominantly traps large particles 22. Once the particles 22 are trapped within the non-woven, they either fall to the bottom of the pad 20 or remain suspended within top layer 21. The liquid absorbency layer holds liquids.

FIG. 2B shows a two layer particle-entrapping pad for small, fine particles 26 such as dirt and dander for which the open-ended non-woven is also efficient, though not necessary. The high loft non-woven top layer 21 is secured to an intermediary liquid absorbent layer 24, which in turn, is secured to the plastic liquid impervious bottom layer 23.

FIG. 2C illustrates a four layer pad combining the features of the pads of FIGS. 2A and 2B.

An optional middle layer can be incorporated into the pad as shown in FIG. 3 thereby creating a three-layer pad 30 having a top non-woven layer 31, a middle layer 34, and a bottom layer 33 with the ability to trap particles 32 and to absorb liquids for evaporation or convenient sequestration. A high loft, non-woven top layer 31 is secured to a plastic liquid impervious bottom layer 33. A fiber 34 with super absorbent polymer 36 serves as an intermediate layer to increase both particle trapping and liquid retention. Particles 32 are trapped in the non-woven layer 31, while liquids that flow through the middle fiber 34 are stopped at the impervious bottom layer 33.

Absorbent middle layer 34 can be made of wood pulp or fluff by itself or enhanced with super absorbent polymer. This middle layer 34 is particularly preferred when brushing a pet after a bath or after exposure to rain or snow. The absorbent layer helps to remove moisture from the pet, thereby facilitating drying of the pet. Middle layer 34 may also contain baking soda, a super absorbent polymer or silica gel, deodorizing agents, antibacterial agents, anti-fungal agents, or skin and coat treatment products such as conditioners and medicine can be added. These added agents are released onto the pet's coat or other treated surface when the pad is used. This is a very efficient way of simultaneously treating and grooming your pet.

For entrapping large and small particles, a variety of inert, non-absorbing high-loft non-wovens exists which can be used. Examples of this high-loft non-woven include polyester, nylon, polypropylene and the like and these can be manufactured in a variety of thicknesses and densities as may be desired by the user or needed for the use. The denier for these materials can range from thick with relatively sparse thread count to thin with very high thread count. These non-woven materials can be manufactured with a tacky material applied to the fibers. Union Wadding Inc. in Pawtucket, R.I. and Hollinee Filtration in Texas, as well as many other non-woven suppliers supply highloft non-wovens in all types of lengths, widths, etc. with or without binding agents or tacky materials applied.

In order to efficiently entrap large particles, the non-woven must preferably have a more open-ended configuration. In order to achieve this enhanced open non-woven configuration, premanufactured highloft non-woven must be cut and abraded or otherwise converted such as to expose additional individual fiber filaments at the surface. Accordingly, the more open non-woven fibers are thereafter preferred for entrapping large particles.

The present invention can be used to replace traditional pet brushes and combs. It can replace lint rollers for human use. They are small, lightweight and can be easily carried in a purse, pet cage, glove compartment, etc. They are inexpensive and disposable. The non-woven layer catches and traps pet hair and dander while being soft and pliable so that the pet feels like it is being petted instead of brushed. When the pad includes a middle absorbent layer, a wet pet can be brushed while at the same time promoting drying or coat and skin treatments can be applied to the pet during brushing. Further, the pads can be used to remove shed pet hair from household items such as clothing, furniture, bedding, etc. by simply wiping the pad across the surface of the item. After use, the pads are simply disposed of so no "de-hairing" of a brush or cleaning of a roller is required. In addition to entrapping hair, dander, and moisture, a pad treated with deodorizing agents can serve as a deodorizer when brushed across the pet or items on which the pet likes to lay. It should be understood that the term "pets" is inclusive of large and small pets, and includes horses. In the case of use with horses, the device functions as a currycomb.

With any of the embodiments, the edges of the pad can be sealed. The edges would be sealed using any known sealing technique such as heat compression or hot melt glue.

The preceding examples and uses are provided for descriptive purposes solely and are not meant to limit the embodiments of the invention. Other configurations of the pad and method for entrapping pet hair and dander will become apparent to those of ordinary skill in the art.

What is claimed is:

1. A pet particle entrapment pad comprising:
   at least one preformed, bonded high loft, non-absorbent non-woven layer formed of synthetic, nonabsorbent fibers, said layer having a first and second surface, said high loft nonwoven being defined as a chemically inert open pure matrix or web;
   wherein at least said first surface of said non-woven layer is converted to a configuration for receiving pet particles;
   wherein said non-woven layer is treated with a cling enhancing substance; and
   wherein said pet particles become entrapped within said non-woven layer upon moving contact with a surface containing pet particles.

2. The pet particle entrapment pad of claim 1, wherein said pet particles are selected from the group comprising: pet hair; pet dander; pet dirt.

3. The pet particle entrapment pad of claim 1, wherein said surface is selected from the group comprising: an animal; clothing, furniture; and bedding.

4. The pet particle entrapment pad of claim 1, wherein said cling enhancing substance is a tackifier resin.

5. The pet particle entrapment pad of claim 4, wherein said non-woven layer is further treated with a deodorizing agent.

6. The pet particle entrapment pad of claim 1, further comprising an absorbent middle layer.

7. The pet particle entrapment pad of claim 6, wherein said absorbent layer removes moisture from a wet animal.

8. The pet particle entrapment pad of claim 6, wherein said absorbent layer contains at least one pet treatment agent.

9. The pet particle entrapment pad of claim 8, wherein said pet treatment agent selected from the group comprising: a cleanser; a conditioner; a medication.

10. A pet particle entrapment pad comprising:
at least one preformed, bonded high loft, non-absorbent non-woven layer formed of synthetic, nonabsorbent fibers, said layer having a first and second surface, said high loft nonwoven being defined as a chemically inert open pore matrix or web;
wherein at least said first surface of said non-woven layer is converted to a configuration for receiving pct particles;
an impermeable layer in contact with said second surface; and
wherein said pet particles become entrapped within said non-woven layer upon moving contact with a surface containing pct particles.

11. The pet particle entrapment pad of claim 10, further comprising an absorbent middle layer.

12. The pet particle entrapment pad of claim 11, wherein said absorbent layer contains at least one pct treatment agent.

13. The pet particle entrapment pad of claim 12, wherein said pet treatment agent selected from the group comprising: a cleanser; a conditioner; a medication.

14. The pet particle entrapment pad of claim 1, wherein said synthetic, nonabsorbent fibers are selected from the group comprising: polyester, polypropylene; nylon; rayon; and a combination or blend of two or more such materials.

15. The pet particle entrapment pad of claim 1, further comprising said first surface forming a series of indentations within the bonded, high loft nonwoven that resemble grooves, channels, cuts or slits for providing increased surface area of said first surface for purposes of increasing interactions with or attractions to debris, pet hair; pet dander or pet dirt.

16. The pet particle entrapment pad of claim 15, further comprising said second surface forming a series of indentations within the bonded, high loft nonwoven that resemble grooves, channels, cuts or slits for providing increased surface area of said second surface for purposes of increasing interactions with or attractions to debris, pet hair; pet dander or pet dirt.

17. The pet particle entrapment pad of claim 10, wherein said non-woven layer is treated with a cling enhancing substance.

18. The pet particle entrapment pad of claim 17, wherein said cling enhancing substance is a tackifier resin.

19. The pet particle entrapment pad of claim 17, wherein said non-woven layer is treated with a deodorizing agent.

20. The pct particle entrapment pad of claim 17, wherein said non-woven layer is further treated with a pet treatment agent selected from the group comprising a cleanser; a conditioner; a medication.

21. The pct particle entrapment pad of claim 10, further comprising:
at least a second high loft non-woven layer having a third and a fourth surface, said third surface being attached to said second surface; and
an active ingredient retained between said second and said third surface.

22. The pet particle entrapment pad of claim 21, wherein said active ingredient is selected from the group comprising: odor counteractive agents; baking soda; silica particles; medications; grooming lotions; super absorbent polymers; antibacterials; antimicrobial; antifungal agents; skin and coat treatment products; and, conditioners.

23. The pet particle entrapment pad of claim 21, wherein a plurality of different said active ingredients are retained between said second and said third surfaces.

* * * * *

UNITED STATES PATENT AND TRADEMARK OFFICE
CERTIFICATE OF CORRECTION

| | | |
|---|---|---|
| PATENT NO. | : 7,647,890 B1 | Page 1 of 1 |
| APPLICATION NO. | : 10/876310 | |
| DATED | : January 19, 2010 | |
| INVENTOR(S) | : Pat Yananton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 72 days.

Signed and Sealed this

Sixteenth Day of November, 2010

David J. Kappos
*Director of the United States Patent and Trademark Office*